United States Patent [19]

Gayot

[11] 3,893,397
[45] July 8, 1975

[54] CONTINUOUS TRANSPORT SYSTEM FOR TRAINS WITH PROGRAMMED VEHICLES

[75] Inventor: Jean Gayot, Meudon, France

[73] Assignee: Engins Matra, Paris, France

[22] Filed: Feb. 26, 1974

[21] Appl. No.: 445,841

[30] Foreign Application Priority Data

Feb. 28, 1973 France .......................73-07199

[52] U.S. Cl.................................. 104/18; 104/27
[51] Int. Cl............................................. B61k 1/00
[58] Field of Search ............ 104/18, 20, 25, 27, 28, 104/29, 30, 31

[56] References Cited
UNITED STATES PATENTS

| | | | |
|---|---|---|---|
| 828,340 | 8/1906 | Rice...................................... | 104/20 |
| 3,552,321 | 1/1971 | Priebe................................... | 104/18 |
| 3,675,584 | 7/1972 | Hall ..................................... | 104/27 X |
| 3,788,232 | 1/1974 | Schneider et al................. | 104/28 X |

Primary Examiner—M. Henson Wood, Jr.
Assistant Examiner—Randolph A. Reese
Attorney, Agent, or Firm—Kinzer, Plyer, Dorn & McEachran

[57] ABSTRACT

A continuous transport system for trains with programmed vehicles.

The system comprises at each station a connection track ($H_{10}$, $H_{20}$, $H_{11}$, $H_{21}$, $H_{13}$, $H_{23}$) linking the outward track (OX) to the return track (X'O') or conversely, to enable a train travelling from a high density traffic area to a less dense traffic area, to reduce the number of its vehicles and, to enable a train travelling in the opposite direction to recover vehicles.

The system for transporting persons comprises a minimum number of vehicles to ensure maximum flow.

3 Claims, 5 Drawing Figures

CONTINUOUS TRANSPORT SYSTEM FOR TRAINS WITH PROGRAMMED VEHICLES

The present invention relates to a continuous transport system for trains with programmed vehicles.

More particularly, the invention relates to a continuous transport system for trains with programmed vehicles of the type comprising a principal track serving stations by means of secondary tracks and comprising trains constituted of at least one vehicle moving on the principal track, on which each vehicle is provided with its own programming and propulsion means enabling it to choose and reach its destination. The vehicle thus concerned leaves the track before the entry to the station by taking the secondary track to unload and load passengers with the aid of a platform, and then rejoins the principal track and attaches itself to the front or back of one of the trains following the one from which it had detached itself.

But, the distribution of traffic density has a maximum which is generally located at the center of the line and diminishes progressively toward the two extremities of the line. But, in the case of a transport system, according to the principal U.S. Pat. No. 3,839,964, the assembly of vehicles forming the trains travel from one extremity of the line to the other. It follows that each train must comprise at least as many vehicles as is required by the highest density traffic area. It will immediately be seen that a large number of vehicles is not used on certain parts of the line, in particular towards the extremities of it, in the case where the traffic density on the line has the usual distribution configuration.

The object of the present invention is to overcome these disadvantages and to provide a means enabling the composition of the trains (number of vehicles) to be adjusted to the traffic density of the relevant part of the line.

To this end, the invention relates to a system characterised in that at each station it comprises a connection track linking the outward track to the return track, or inversely, to enable a train going from a high density traffic part to a less dense traffic part, to reduce the number of vehicles of which it consists, and a train travelling in the opposite direction to recover vehicles.

According to other characteristic features of the invention, the connection track is a curved track or a track forming a reversal point, the vehicles using it moving first in one direction, when leaving one of the tracks and arriving on the other track moving in the opposite direction.

According to other characteristic features of the invention, the connection tracks have the form of an X constituting at the same time a shunt track going toward the platforms and a connection track linking the outward line to the return line, or else the connection tracks have the form of an X, constituting a shunt track going to the platform for each line (outward, return), and a connection loop between the outward and return tracks, without a reversal point, enabling vehicles moving in one direction only to be used.

Various variants are possible. It is thus possible to envisage connection tracks in the form of a loop, with reversal points, or a combination of two reversal points, a loop and one reversal point. etc.

By means of this improvement, it is possible to adjust the number of vehicles travelling to the traffic density in a very precise manner. If, at each station, two connection tracks are provided, of which one links the outward track to the return track and the other links the return track to the outward track, then if the highest traffic density area is displaced to both sides of this station, one or other of the connection tracks can be used alternatively.

In addition, if these two connection tracks are linked to one another, they can also serve as shunt tracks going toward the platforms and enabling vehicles either to reach the other track, or rejoin the track they have just left, below the station.

In general, thanks to this invention, it is possible to reduce considerably the number of vehicles travelling on a track without however reducing the possible flow or the comfort of passengers.

The present improvement will be described in greater detail with the aid of various modes of embodiment shown schematically in the accompanying drawings in which.

Figure 1:
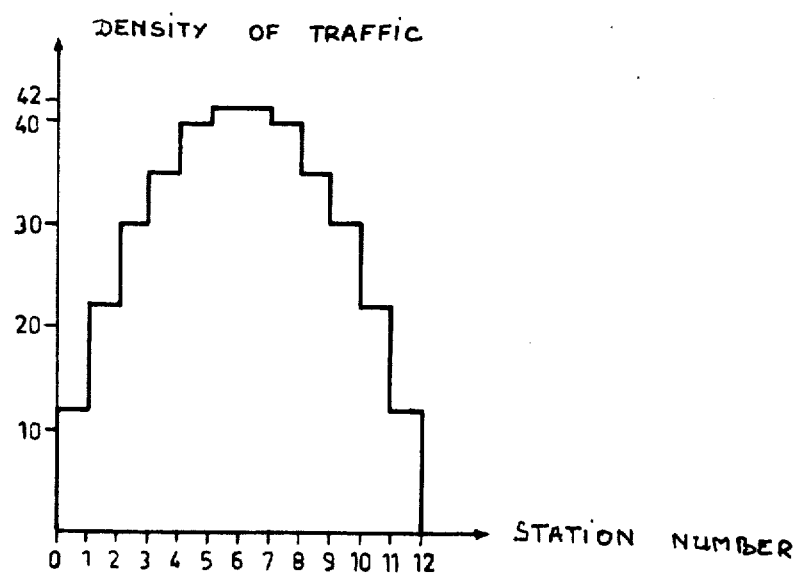
FIG. 1 is an example of a diagram representing the number of passengers travelling on a conventional transport line.

On a transport line with its own tracks, passing through a centre of population, the density of passengers between stations can be represented schematically as shown in FIG. 1. This density is highest in the middle of the line and diminishes progressively toward the two extremities of the line.

The discontinuous curve in FIG. 1 has a certain symmetry with respect to its maximum.

In the case where transport is provided by vehicles of a conventional train, that is to say, comprising a constant number of vehicles between the two extremities of the line, the train must be assembled in accordance with the maximum density of persons to be transported, that is to say, in accordance with the number of persons travelling between the few stations in the middle of the line. On the other hand, at the two extremities of the line, the trains travel with a smaller or even a zero occupation coefficient.

The disadvantages of this situation have been detailed herein above.

According to the present inprovement, at each station, the line is arranged, as shown in FIGS. 2, 3, 4, and 5. In general, this consists of joining the outward line OX to the return line (X'O').

This enables the number of vehicles in each train to be adjusted to the density of the traffic on portions of the line. Thus, in the heavy traffic part, complete trains are made to travel. These trains, called complete, travel as indicated in the principal patent. The vehicles that separate from the trains by taking a shunt line in order to go to platforms, then, after exchanging passengers, rejoin the principal track where they attach themselves to the other vehicles of a train.

This mode of operation is not shown.

In the sectors of the line where the density of passengers diminishes, only a fraction of the vehicles taking the shunt track rejoin the principal track (the case in FIGS. 4 and 5), while the rest of these vehicles which have taken the shunt track, are brought onto the other track or the return track.

Figure 2:
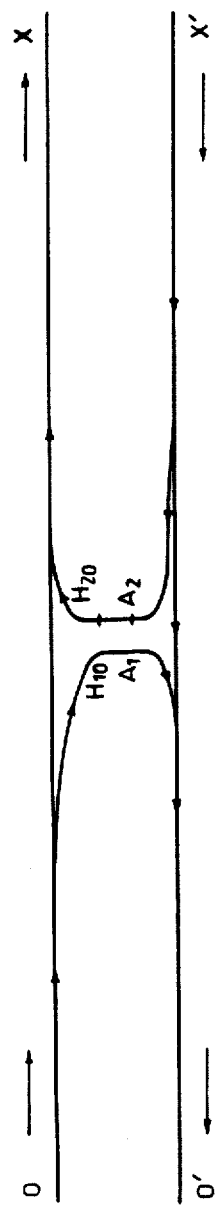
FIG. 2 is a diagram of a first embodiment of two stations according to the invention.
Figure 3:
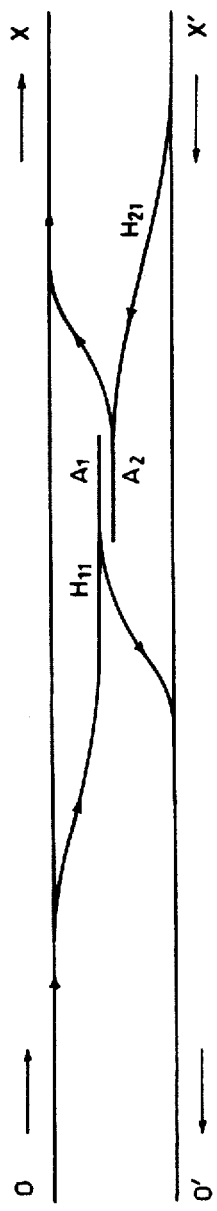
FIG. 3 is a diagram of a second embodiment of the invention.

In the cases shown in FIGS. 2 and 3, all the vehicles which take the shunt track are brought back. The passengers must therefore choose carefully the vehicle they take so as not to be obliged to change vehicle at a station which is not their destination.

As the trains arrive in stations that are away from the centre where the traffic density is lower, vehicles are detached from the train and brought back into the higher traffic density area. If it is assumed that the high traffic density area is on the left hand side in the FIGS. 2 to 4, and the lower density area is on the right hand side of these same figures, all the trains travelling from O to X release to each station a certain number of vehicles, which rejoin the return trains travelling from X' to O', that is to say, returning to the high traffic density area.

According to a first embodiment of the invention (FIG. 2), the trains, which are not shown, travel on an outward line OX and a return line X'O'. At each station, the line OX is connected to the line X'O', by means of a track $H_{10}$ going to the platform $A_1$. Likewise, the line X'O' is linked to the line OX by a track $H_{20}$ going to the platform $A_2$. Vehicles can thus be separated from the principal train and made to take the track $H_{10}$ or $H_{20}$ and come back moving in a direction opposite to that of their preceding direction.

The infrastructure in FIG. 2 can use trains constituted by asymmetric vehicles, that is to say, vehicles whose front portion is different from their rear portion or which travel only in one direction.

The mode of embodiment in FIG. 3 comprises connection tracks of cissoid geometry $H_{11}$, $H_{21}$ going to the platform $A_1$ and $A_2$, these tracks $H_{11}$ and $H_{21}$ forming reversal points. This means that vehicles detached from a train going from O toward X arrive at the platform $A_1$ by moving in one direction, while to leave this platform and rejoin the track X'O', the vehicles must reverse their direction of travel. This requires symmetrical vehicles.

In that case, all the vehicles taking the shunt track, are brought back.

The third mode of embodiment (FIG. 4) is a variant of that shown, in FIG. 3. The cissoid lines $H_{12}$, $H_{22}$ which form reversal points are joined so that trains can pass from one to the other. Because of this, the vehicles taking the line $H_{12}$, can pass to the line $H_{22}$, and conversely. Such an infrastructure is suitable both for symmetrical and unsymmetrical vehicles. It enables vehicles to return to the track thay have left and go to the station or rejoin another track.

Figure 4:
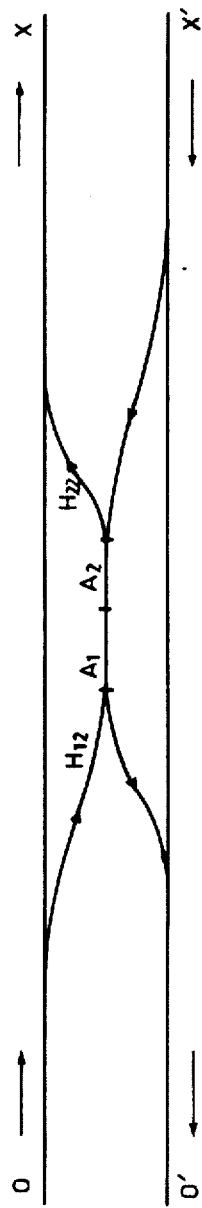
FIG. 4 is a diagram of a third embodiment of the invention.
Figure 5:
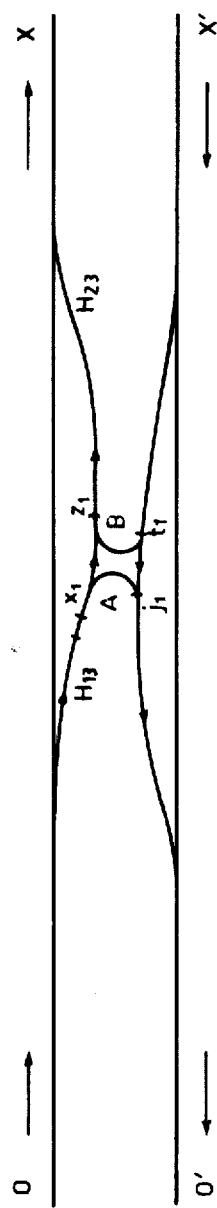
FIG. 5 is a diagram of a fourth embodiment combining the variants, shown in the FIGS. 2 and 3.

The fourth variant, representing FIG. 5, relates to the shunt tracks $H_{13}$, $H_{23}$ which enable a vehicle released from a train, either to return onto X'O', or rejoin the principal track OX below the station, as shown in FIG. 4. However, in this case, the vehicles can be asymmetrical (no reverse travel).

Two tracks, $H_{10}$, $H_{20}$, $H_{11}$, $H_{21}$, $H_{12}$, $H_{22}$, $H_{13}$, $H_{23}$, have been shown above in a general manner for each station.

It is evident that this doubling of return means is not necessary in all cases. In the central part of the line, in certain cases, it may be necessary to send back vehicles toward the right and in other cases toward the left, in accordance with the displacement of the maximum traffic density in this central part. A station of the type shown in FIGS. 3 and 4 is then advantageous.

On the other hand, in the peripheral parts, where there is an irreversible decrease in traffic density, it is sufficient to equip the stations with tracks $H_{10}$, $H_{11}$, $H_{12}$, $H_{13}$, if it is assumed that the highest density is on the left. If this is not the case, shunt lines $H_{20}$, $H_{21}$, $H_{22}$, $H_{23}$ are chosen.

In order to simplify the operation of a line, and avoid problems relating to vehicles of a train meeting or being regrouped, the lines are used with a traffic density decreasing from the centre toward the extremities of the line, which means that vehicles are added to or removed from each train according to whether it is approaching or leaving the centre. The vehicles of a train can be assembled in the order in which they will be separated from the train. In general, the infrastructures comprise means of signalling and switching enabling vehicles to be separated from the principal trains. For switching, since the vehicles travel in trains, it is preferable to have switching means carried on board. In the case where the track itself comprises switching points, the vehicles to be separated from the train must be a certain distance away from the train to enable the points to be operated. These various means are not the subject of the present invention.

It is obvious that the invention is not limited to the examples of its embodiment herein above described and illustrated. If need be, other forms and other modes of embodiment can be employed without departing from the scope of the invention.

What I claim is:

1. A track transport system for trains with programmed vehicles comprising a principal outward track and a principal return track, contiguous station platforms located between the tracks respectively for passengers leaving the outward and return trains, and respective connecting tracks of cissoid shape, one connecting track joining the outward track to the return track while servicing one of the passenger platforms and the other connecting track joining the return track to the outward track while servicing the other station platform, characterized in that each connecting track has a section enabling the train to approach its station platform from one direction while leaving the platform in the opposite direction.

2. A track system according to claim 1 where the connecting tracks are of disjointed cissoid form, each having a reversing terminus adjacent its platform.

3. A track system according to claim 1 where the connecting tracks are of cissoid form are joined so that trains can pass from one connecting track to the other, or can be reversed at the platforms or can be shunted back to the principal track where the train originated.

* * * * *